(12) United States Patent
Kadlec et al.

(10) Patent No.: US 7,402,252 B2
(45) Date of Patent: Jul. 22, 2008

(54) AUTOMATED ELECTROLYTE ADDITION FOR SALT WATER POOLS, SPAS, AND WATER FEATURES

(75) Inventors: Leonard J. Kadlec, Woodbury, MN (US); Patrick H. Kilawee, Hugo, MN (US)

(73) Assignee: Ecolab Inc., St. Paul, MN (US)

( * ) Notice: Subject to any disclaimer, the term of this patent is extended or adjusted under 35 U.S.C. 154(b) by 220 days.

(21) Appl. No.: 11/157,020

(22) Filed: Jun. 20, 2005

(65) Prior Publication Data

US 2006/0283808 A1 Dec. 21, 2006

(51) Int. Cl.
*C02F 1/50* (2006.01)

(52) U.S. Cl. .................. 210/746; 210/764; 210/192

(58) Field of Classification Search .................. 210/744, 210/746, 110, 764, 192; 204/252–258
See application file for complete search history.

(56) References Cited

U.S. PATENT DOCUMENTS

| | | | |
|---|---|---|---|
| 4,097,356 A * | 6/1978 | Yates | 204/237 |
| 4,136,005 A * | 1/1979 | Persson et al. | 204/266 |
| 5,037,519 A | 8/1991 | Wiscombe | |
| 6,508,929 B1 | 1/2003 | Mercer | |
| 6,627,073 B2 * | 9/2003 | Hirota et al. | 210/167.11 |
| 6,821,398 B2 | 11/2004 | Von Broembsen | |
| 6,827,847 B1 | 12/2004 | Chauvier | |
| 2006/0249400 A1 * | 11/2006 | Bremauer | 205/743 |

FOREIGN PATENT DOCUMENTS

WO   WO 2004/108613 A1   12/2004

* cited by examiner

*Primary Examiner*—Walter D. Griffin
*Assistant Examiner*—Cameron J Allen
(74) *Attorney, Agent, or Firm*—Kinney & Lange, P.A.

(57) ABSTRACT

An automated system of the present invention adds electrolyte into a pool. The automated system includes a sanitizer generator, a circulation system, and an electrolytic solution delivery system. The circulation system, which includes the sanitizer generator, has a suction line and a discharge line that delivers water from the pool through a circulation path. The delivery system controls the introduction of electrolyte into the water.

11 Claims, 3 Drawing Sheets

AUTOMATED ELECTROLYTE ADDITION FOR SALT WATER POOLS, SPAS, AND WATER FEATURES

CROSS-REFERENCE TO RELATED APPLICATION(S)

The present application is related to the concurrently filed applications Ser. No. 11/157,041, "Pool and Spa Dual Body Sanitizaition" and Ser. No. 11/157,073, "Dual Generator Single Power Source for Tandem Pool and Spa."

BACKGROUND OF THE INVENTION

The present invention relates to the field of sanitizing pools and spas. In particular, the present invention relates to an automated system for adding an electrolytic solution (i.e. sodium chloride, potassium chloride, sodium chlorite etc.) to swimming pools, spas, and other water features.

Pools, spas, and water features have a circulation system that continually pumps water from the pool or spa through a filter, heater, and sanitizer feed system before returning the water back to the pool, spa, or water feature. The circulation system is necessary to maintain the body of water at sanitary conditions. The water passes through the filter to reduce the accumulation of foreign material, such as hair, soil, or solids, in the pool or spa. Once the water has been filtered, the water passes through the heater, where the water is heated prior to returning to the pool, spa, or water feature.

In addition to filtering, pool, spa, and water feature water also requires regular sanitization in order to maintain hygienic conditions. Allowing sanitation levels to either fall below or rise above required specifications results in decreased efficiency of the system. Low levels of chemical sanitizer in the pool, spa, or water feature can contribute to algae blooms, bacterial breakouts, cloudiness in the water, and chemical imbalances. One method for sanitizing pool or spa water is by adding sodium chloride (NaCl) to the pool, spa, or water feature and passing the sodium chloride containing water through a chlorine generator where electrolysis converts the sodium chloride and water to sodium hypochlorite (NaOCl), by the following reaction:

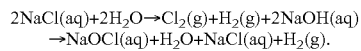

$$2NaCl(aq) + 2H_2O \rightarrow Cl_2(g) + H_2(g) + 2NaOH(aq)$$
$$\rightarrow NaOCl(aq) + H_2O + NaCl(aq) + H_2(g).$$

The chlorine generator is capable of being powered on and off depending on the concentration of sanitizer in the water. When there is a sufficient level of sanitizer in the pool or spa water, the chlorine generator is powered off and no reaction takes place as water passes through it. Thus, water circulating through the circulation system is filtered and heated, but the composition of the water is not altered. When the level of sanitizer has fallen to a minimum level, the chlorine generator is powered on and the sodium chloride and water passing through the chlorine generator is converted to sodium hypochlorite. The chlorine generator remains powered on until the concentration of sanitizer in the water has reached a desired steady state level.

To be effective, electrochemical generation of chlorine in a circulation system of a pool or spa requires sodium chloride to be maintained in the pool or spa water within a specified range to efficiently produce chlorine. Water in the pool or spa can be lost due to filter backwash, bather carry-out, and leaks in the infrastructure of the pool or spa body and plumbing. When the water level in the pool or spa decreases to a minimum level, fresh water must be pumped into the pool or spa to restore the water level to normal operating conditions. Fresh water is typically added to the pool or spa through a fresh water line plumbed directly to the pool or spa. As fresh water is added, sodium chloride must also be added to replenish loss of sanitizer from the pool or spa water.

Currently, sodium chloride is added directly to the pool or spa by manually pouring bags of granular salt along the perimeter of the pool and subsequently brushing the salt into the pool to increase the speed of dissolution and to inhibit corrosion of the plaster surface from direct contact with the sodium chloride. Although this method is necessary during the start-up process due to the high initial charge of salt required to reach target concentrations, this procedure becomes a time-consuming project when dosing for maintenance purposes. Manual addition of sodium chloride to a pool or spa also increases the risk of improperly dosing or adjusting the level of salt concentration in the pool. Increased voltage and heat generation of the system can also increase when the level of electrolyte is below the required specification, potentially resulting in electrical component failures. High levels of electrolyte in the pool can increase the potential for corrosion for pool equipment and pool surfaces.

BRIEF SUMMARY OF THE INVENTION

An automated system of the present invention adds electrolyte into a body of water, such as a pool, spa, or water feature to maintain a level of electrolyte concentration in the water. The automated system includes a generator, a circulation system, and an electrolytic solution delivery system. The circulation system, which includes the generator, has a suction line and a discharge line that delivers water from the body of water through a circulation path. The introduction of electrolyte into the water is controlled by the delivery system.

DETAILED DESCRIPTION

Figure 1:
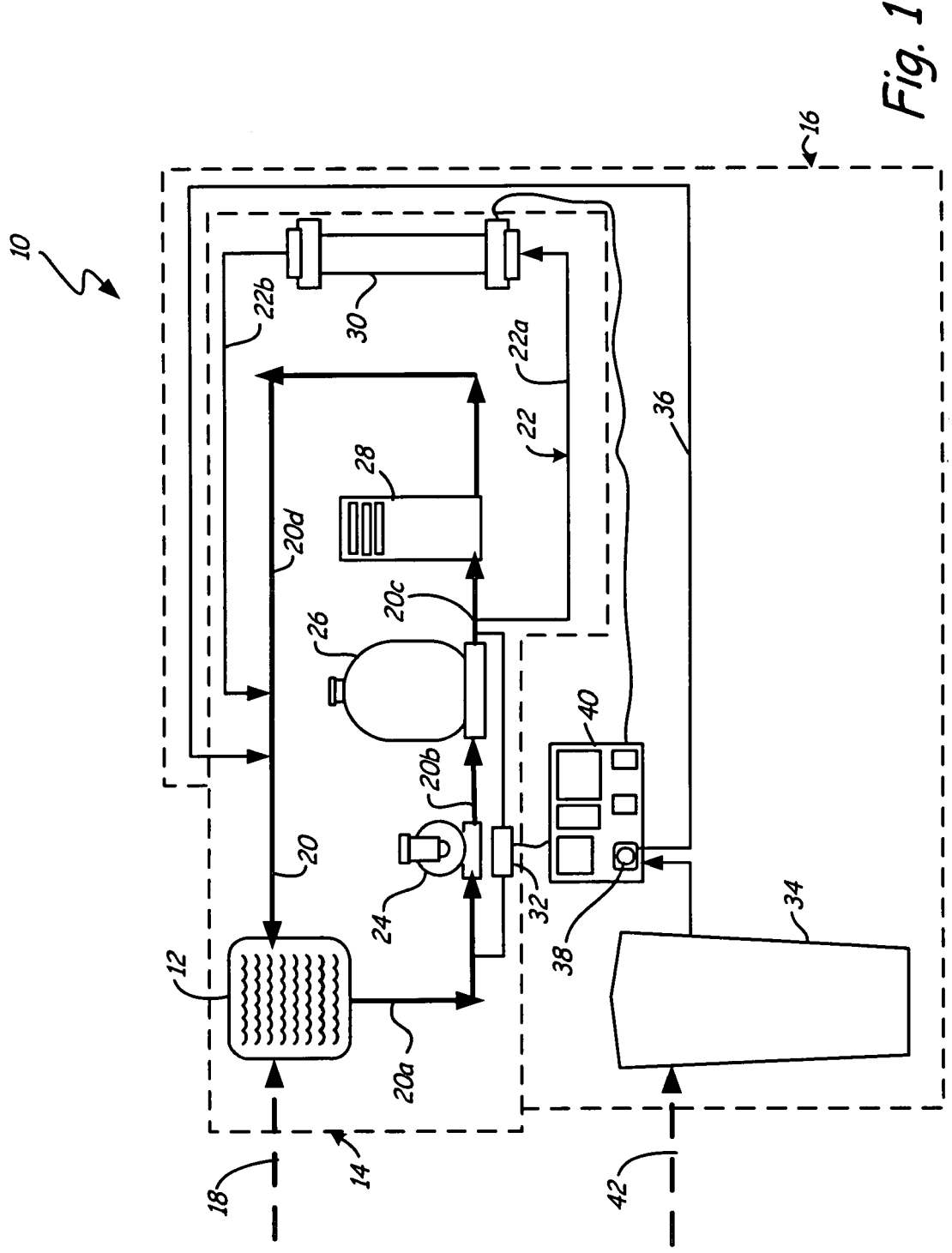
FIG. 1 is a schematic diagram of a first embodiment of a sanitization system with automated electrolyte addition in accordance with the present invention.

FIG. 1 is a schematic diagram of a first embodiment of sanitization system 10 in accordance with the present invention. Sanitization system 10 is an automated system that maintains electrolyte concentration in a body of water, such as pool 12, by introducing an electrolytic solution, such as brine, into the water. Pool 12 may be any body of water to be treated, such as a swimming pool, spa, or other water feature. Automated addition of electrolyte to pools and spas is beneficial for reducing maintenance time of pool attendants and maintaining sanitizer concentrations in the body of water.

Sanitization system 10 generally includes circulation system 14, electrolytic solution feed system 16, and fresh water line 18. Circulation system 14 includes piping 20, side stream 22, circulation pump 24, filter 26, heater 28, sanitizer generator 30, and sensor 32. Electrolytic solution feed system 16 includes electrolytic solution vessel 34, feed stream 36, and electrolytic solution pump 38. Fresh water line 18 connects pool 12 to a fresh water source and replenishes pool 12 when the water level in pool 12 drops below a minimum level.

Controller 40 controls the addition of electrolyte by activating and deactivating electrolytic solution pump 38, and controls the production of sanitizer by powering on and off sanitizer generator 30.

Circulation system 14 runs continuously and operates independently of electrolytic solution feed system 16 and sanitizer generator 30. When there is a sufficient level of sanitizer in sanitization system 10, electrolytic solution pump 38 is deactivated and sanitizer generator 30 is powered off. Piping 20 of circulation system 14 generally includes suction line 20a, first intermediate line 20b, second intermediate line 20c, and discharge line 20d. Suction line 20a connects pool 12 to circulation pump 24, first intermediate line 20b connects circulation pump 24 to filter 26, second intermediate line 20c connects filter 26 to heater 28, and discharge line 20d connects heater 28 to pool 12. Circulation pump 24 is generally positioned immediately downstream from pool 12 and pumps water from pool 12 through piping 20. In one embodiment, circulation pump 24 is a peristaltic pump.

Side stream 22 includes sanitization inlet line 22a and sanitization outlet line 22b. Inlet line 22a is plumbed to circulation system 14 at second intermediate line 20c and connects pool 12 to sanitizer generator 30. When inlet line 22a branches from circulation system 14, some of the water flowing through piping 20 is diverted into side stream 22 at a flow rate lower than the flow rate of the water flowing through piping 20. The water flowing through inlet line 22a enters sanitizer generator 30 and leaves through outlet line 22b.

Because a pump is not plumbed to side stream 22, a pressure drop is required across circulation system 14 to maintain the flow of water in side stream 22 at a velocity sufficient to pass the water through sanitizer generator 30 and back to pool 12. To create a pressure drop across circulation system 14, first portion of side stream 22a is plumbed to circulation system 14 at second intermediate line 20c immediately after filter 26. Positioning side stream 22 downstream from filter 26 and upstream from sanitizer generator 30 also ensures that only a minimal amount of foreign material present in the water enters sanitizer generator 30. Without filter 26, foreign material could accumulate inside sanitizer generator 30 and reduce the life and performance of sanitizer generator 30.

Alternatively, first portion of side stream 22a may also be plumbed to circulation system 14 at first intermediate line 20b immediately after circulation pump 24. However, although positioning side stream 22 between circulation pump 24 and filter 26 would provide an adequate pressure drop across circulation system 14, the water entering sanitizer generator 30 would be unfiltered. Thus, installation of an in-line strainer with a small mesh in sanitization inlet line 22a would be necessary to reduce build-up of foreign material in sanitizer generator 30.

Sanitizer generator 30 is an electrolytic cell which produces a sanitizer from the water pumped through piping 20 when sanitizer generator 30 is powered on. When automated sanitization system 10 is at steady state, sanitizer generator 30 is powered off and no reaction takes place as water passes through sanitizer generator 30. Thus, water circulates through side stream 22 and sanitizer generator 30 without altering the composition of the water. In one embodiment, sanitizer generator 30 is a watertight tube containing titanium plates coated with a precious metal. Although sanitizer generator 30 is shown in FIG. 1 as being plumbed off-line from pool 12, sanitizer generator 30 may also be plumbed in-line with pool 12 without departing from the scope of the intended invention.

After the water has passed through sanitizer generator 30, the water continues through sanitization outlet line 22b, which reconnects to piping 20 downstream from heater 28 at discharge line 20d.

Sensor 32 is located in circulation system 14 downstream from pool 12 and measures the conductivity of the water passing through circulation system 14. Automated sanitization system 10 is at steady state when the conductivity of the water in circulation system 14 is above a minimum level. Although sensor 32 is described as sensing the conductivity of the water, sensor 32 may also sense other variables in addition to (or instead of) sensing the conductivity of the water without departing from the scope of the intended invention. For example, sensor 32 may sense the pH or the oxidation-reduction potential of the water. In addition, although sensor 32 is depicted in FIG. 1 as being located immediately downstream from pool 12, sensor 32 may be located anywhere in circulation system 14 as long as it is upstream of where electrolyte is injected into circulation system 14.

Electrolytic solution feed system 16 connects electrolytic solution vessel 34 to circulation system 14 and transports electrolytic solution from electrolytic solution vessel 34 to pool 12. In one embodiment, electrolytic solution vessel 34 is a softener style atmospheric vessel with a float valve mechanism located within vessel 34. Fresh fill line 42 connects vessel 34 to a fresh water source. When the level of electrolyte in vessel 34 drops to a minimum level, the float valve is activated and water is added to vessel 34 through fresh fill line 42 to dissolve the electrolyte, which is manually added to vessel 34. The mixture of electrolyte and water in vessel 34 create an electrolytic solution. The electrolytic solution is then maintained in vessel 34 until electrolytic solution pump 38 is activated. In one embodiment, the electrolytic solution has a concentration of approximately 3000 to 6000 parts per million electrolyte. Although FIG. 1 depicts fresh fill line 42 as stemming from a remote location, fresh fill line 42 can add water from either a remote water source or from circulation system 14.

Feed stream 36 is typically plumbed to circulation system 14 at discharge line 20d of piping 20. This positioning serves two purposes. First, plumbing feed stream 36 to circulation system 14 downstream from heater 28 prevents the electrolytic solution from coming into contact with any of the other system equipment and accelerating corrosion. Second, plumbing feed stream 36 to circulation system 14 downstream of sensor 32 also allows the electrolytic solution to enter pool 12 without affecting the reading of sensor 32.

Controller 40 is in communication with sensor 32, electrolytic solution pump 38, and sanitizer generator 30. Sensor 32 has the ability to cause controller 40 to either activate or deactivate electrolytic solution pump 38 to keep salinity levels in pool 12 in a specific range. When the conductivity of the water reaches a minimum level, a signal from sensor 32 causes controller 40 to activate electrolytic solution pump 38. Electrolytic solution pump 38 pumps low concentrations of electrolytic solution from vessel 34 through feed stream 36 to discharge line 20d of circulation system 14 and into pool 12. When controller 40 activates electrolytic solution pump 38, it also powers on sanitizer generator 30, which generates sanitizer from the electrolyte in the water. In one embodiment, controller 40 is an Acu-Trol AK2100D controller with an optional conductivity circuit board or any controller with the capability to monitor conductivity.

As electrolyte is being added to pool 12, the electrolyte concentration of pool 12 increases and the electrolyte concentration of the water being pumped through circulation system 14 also increases. As the water passes through sanitizer generator 30, the electrolyte and water are converted to sanitizer. The sanitizer leaves sanitizer generator 30 and flows through sanitization outlet line 22b, which reconnects with circulation system 14 at discharge line 20d. The sanitizer then mixes with the heated water flowing through discharge line 20d prior to passing sensor 32 and entering pool 12.

Sensor 32 is continuously communicating the conductivity level of the water in circulation system 14 to controller 40. As sanitizer is added to the water in piping 20, the conductivity of the water increases. Once the conductivity of the water reaches a desired steady state level, there is a sufficient amount of sanitizer in pool 12, and controller 40 deactivates electrolytic solution pump 38 and powers off sanitizer generator 30. When electrolytic solution pump 38 is deactivated and sanitizer generator 30 is powered off, electrolyte is no longer being added to circulation system 14, and the water flowing through circulation system 14 is being filtered and heated, but no longer reacted.

Figure 2:
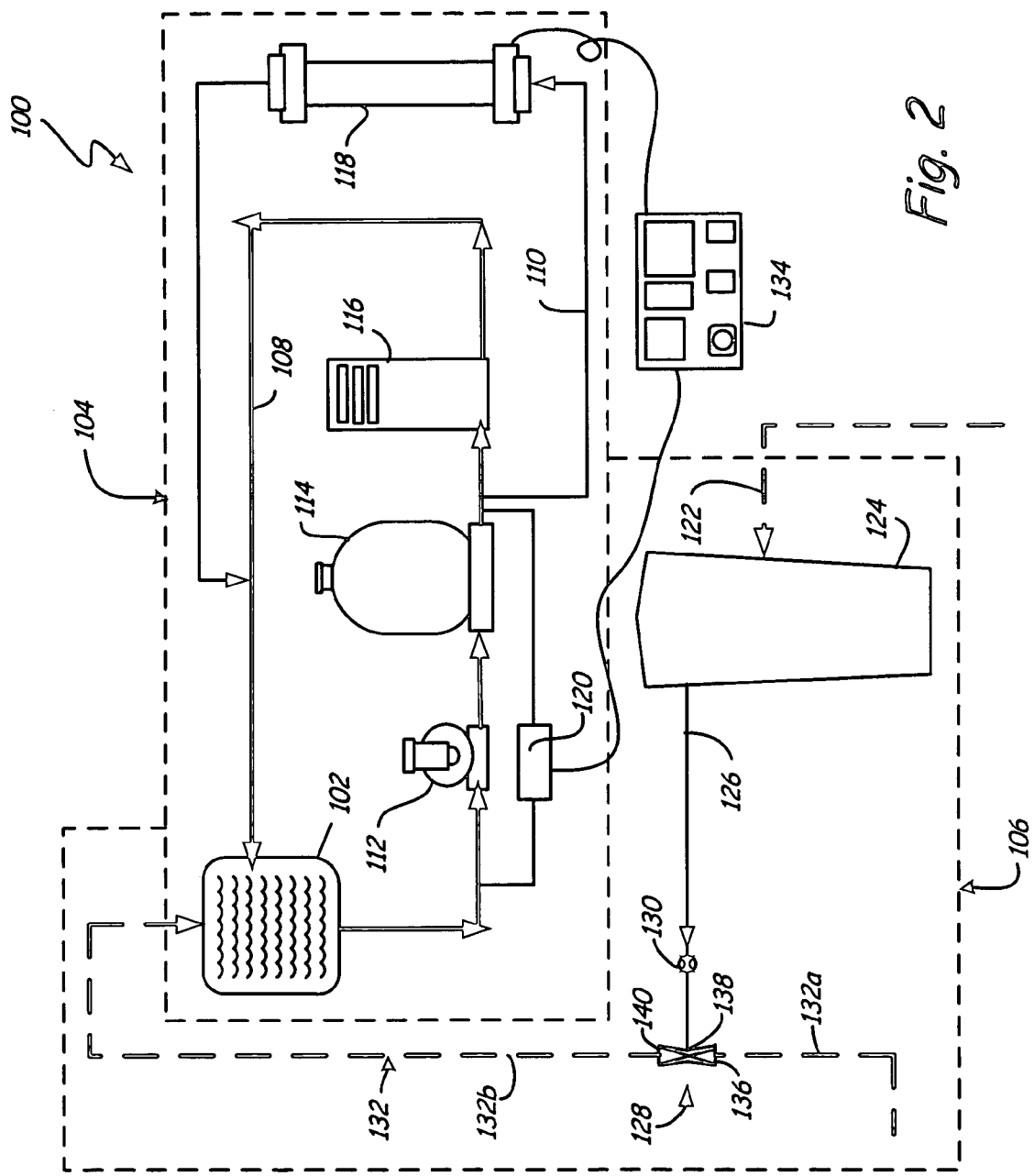
FIG. 2 is a schematic diagram of a second embodiment of the sanitization system with automated electrolyte addition in accordance with the present invention.

FIG. 2 shows a schematic diagram of a second embodiment of automated sanitization system 100 connected to pool 102. Sanitization system 100 generally includes circulation system 104 and electrolytic solution feed system 106. Circulation system 104 includes piping 108, side stream 110, circulation pump 112, filter 114, heater 116, sanitizer generator 118, and sensor 120. Electrolytic solution feed system 106 includes fresh fill line 122, electrolytic solution vessel 124, feed stream 126, aspirator 128, valve 130, and fresh water lines 132a and 132b. Controller 134 is in communication with sensor 120 and controls sanitizer generator 118.

Circulation system 104 of sanitization system 100 is similar to circulation system 14 of sanitization system 10 in design and functionality with the exception that sensor 120 senses the oxidation-reduction potential (ORP), or sanitizer concentration, of the water flowing through circulation system 104. Electrolytic solution feed system 106 of sanitization system 100 adds electrolytic solution to pool 102 when fresh water is added to pool 102 through fresh water line 132. Feed stream 126 connects vessel 124 to fresh water line 132.

Aspirator 128 acts as a bypass and a backflow prevention device and has first inlet 136, second inlet 138, and outlet 140. First inlet 136 is plumbed to fresh water line 132a, which is connected to the fresh water source. Second inlet 138 is plumbed to electrolytic solution feed stream 126, which is connected to vessel 124. Outlet 140 is plumbed to fresh water line 132b, which transports a mixture of fresh water from the fresh water source and electrolytic solution from vessel 124 to pool 102. As fresh water flows through fresh water lines 132a and 132b, a vacuum is created in aspirator 128, and electrolytic solution is suctioned through second inlet 138 of aspirator 128 into fresh water line 132b. Aspirator 128 can be adjusted so that the desired concentration of electrolyte is added when pool 102 is being topped off with fresh water. When pool 102 has a high concentration of electrolyte and needs to be diluted, valve 130 can be closed such that only fresh water passes through fresh water lines 132a and 132b.

Valve 130 is positioned immediately adjacent second inlet 138 of aspirator 128 and may be a metering valve or an on/off valve depending on pool 102. Depending on the environment in which pool 102 is located, pool 102 can lose water primarily either through backwashing and filtering (when pool 102 is located indoors), or through evaporation (when pool 102 is located outdoors). When the water level of pool 102 drops due to backwashing and filtering, water and electrolyte are lost relatively proportionately and a metering valve is used. Valve 130 can be a metering valve that controls the amount of electrolytic solution that enters aspirator 128 and mixes with fresh water. When water is lost through evaporation, water and electrolyte are not lost proportionately and the concentration of electrolyte in pool 102 increases. Valve 130 can be turned off such that only fresh water flows through fresh water lines 132a and 132b. The addition of fresh water increases the level of water in pool 102 and dilutes the high concentration of electrolyte in pool 102.

When there is a sufficient amount of sanitizer in pool 102, sanitizer generator 118 is powered off and the water and electrolyte passing through sanitizer generator 118 is not reacted. Sensor 120 measures the oxidation-reduction potential (ORP), or sanitizer concentration, of the water passing through circulation system 104 and communicates the information to controller 134, which powers sanitizer generator 118 on and off. When sensor 120 communicates to controller 134 that the ORP of the water has reached a desired setpoint, controller 134 powers on sanitizer generator 118. Sanitizer generator 118 remains powered on until sensor 120 communicates to controller 134 that the ORP of the water has reached a sufficient level. Once the ORP of the water has risen to a sufficient level, controller 134 powers off sanitizer generator 118 and water passes through circulation system 104 without being reacted. Although FIG. 2 discusses sensor 120 as measuring the ORP of the water, sensor 120 may measure variables other than (or in addition to) the ORP, such as the conductivity or pH of the water without departing from the intended scope of the invention.

Figure 3:
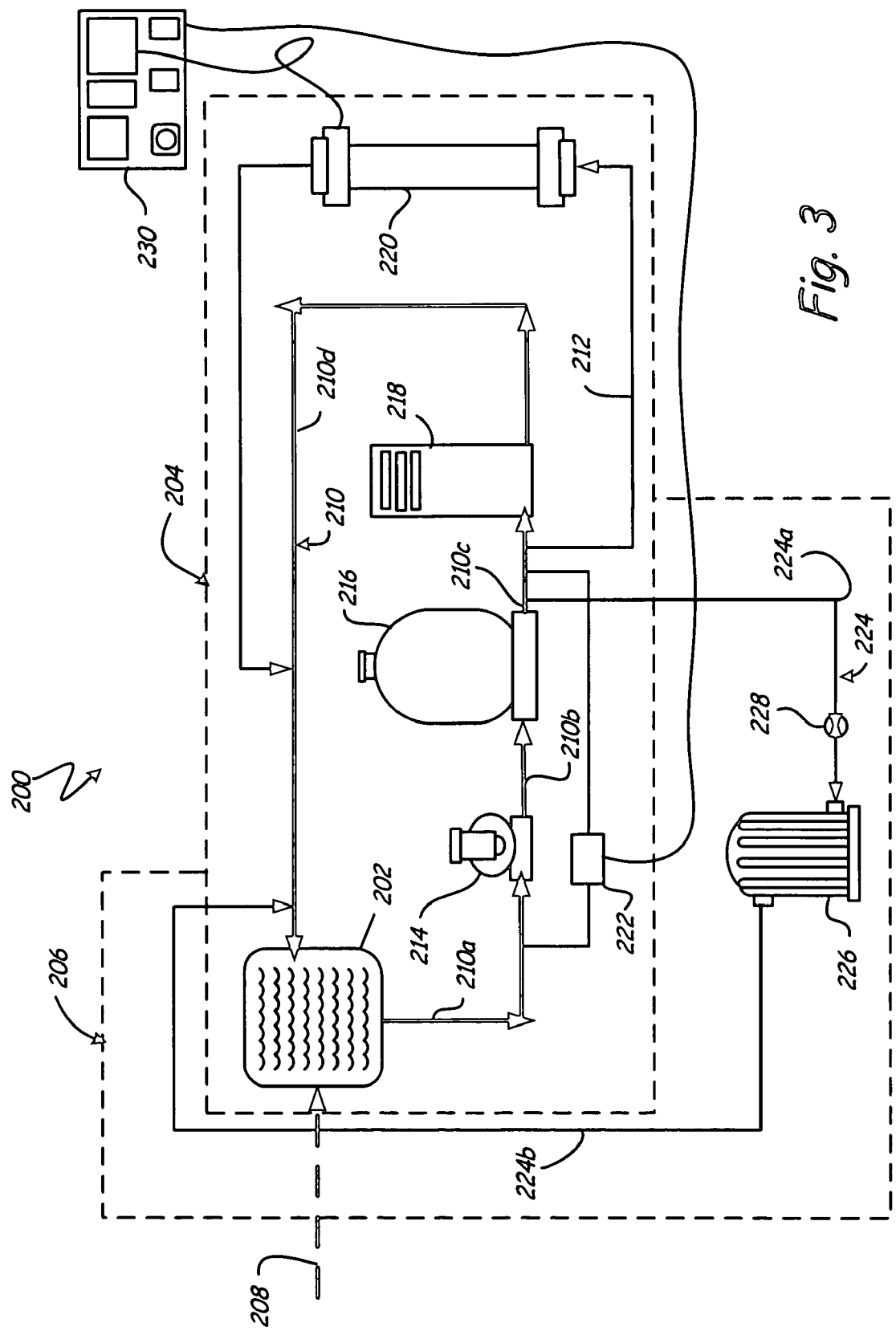
FIG. 3 is a schematic diagram of a third embodiment of the sanitization system with automated electrolyte addition in accordance with the present invention.

FIG. 3 shows a schematic diagram of a third embodiment of automated sanitization system 200 connected to pool 202. Sanitization system 200 generally includes circulation system 204, electrolytic solution feed system 206, and fresh water line 208. Circulation system 204 includes piping 210, side stream 212, circulation pump 214, filter 216, heater 218, sanitizer generator 220, and sensor 222. Electrolytic solution feed system 206 includes feed stream 224, pressure vessel 226, and metering valve 228.

Circulation system 204 and fresh water line 208 are similar to circulation system 14 and fresh water line 18 of sanitization system 10 in design and functionality with the exception of sensor 222. Sensor 222 and controller 230 function in the same manner as sensor 120 and controller 134 of sanitization system 100. Electrolytic solution feed system 206 of sanitization system 200 uses a continuous feed "trickle" method for adding electrolytic solution to pool 202 such that electrolyte is continuously added to circulation system 204 through feed stream 224 in small quantities.

Electrolytic solution feed stream 224 has inlet line 224a and electrolytic solution delivery line 224b and is connected to circulation system 204 at two locations. Inlet line 224a transports water from circulation system 204 to vessel 226 and is plumbed to circulation system 204 at second intermediate line 210c downstream from filter 216. Electrolytic solution delivery line 224b carries electrolytic solution from vessel 226 to circulation system 204 and is plumbed to circulation system 204 at discharge line 210d. Electrolytic solution feed stream 224 uses the pressure drop from filter 216 to discharge line 210d to maintain flow through feed stream 224 and to feed electrolytic solution from vessel 226 to pool 202. Although FIG. 3 depicts inlet line 224a plumbed to circulation system 204 at second intermediate line 210c, inlet line 224a can also be plumbed to circulation system 204 at first intermediate line 210b without departing from the intended scope of the invention.

Water continuously flows through feed stream 224 and vessel 226. The rate of water flow through feed stream 224 is controlled by metering valve 228. Metering valve 228 allows only a specific amount of water to pass into vessel 226. Thus, after the water mixes with the electrolyte in vessel 226 to produce an electrolytic solution, only a specific amount of electrolytic solution leaves vessel 226. Although FIG. 3 depicts metering valve 228 plumbed in inlet line 224a, metering valve 228 can also be plumbed in electrolytic solution delivery line 224b without departing from the intended scope of the invention.

When the oxidation-reduction potential (ORP) of the water flowing through circulation system 204 is at a sufficient level, sanitizer generator 220 is powered off. As water and electrolyte is lost from the system, the ORP of the water decreases and sanitizer needs to be produced and introduced into the system. When the ORP of the water has reached a desired setpoint, sensor 222 signals controller 230, which powers on sanitizer generator 220. Because electrolytic solution is continuously being fed into circulation system 204, electrolyte is present in the water at a level sufficient for sanitizer generator 220 to react and convert the water and electrolyte to sanitizer. Once the ORP of the water has reached a sufficient level, sanitizer generator 220 is powered off and water flows through circulation system 204 without being reacted. Although FIG. 3 discusses sensor 222 as measuring the ORP of the water, sensor 222 may measure variables other than (or in addition to) the ORP, such as the conductivity or pH of the water without departing from the intended scope of the invention.

The automated sanitization system of the present invention adds electrolyte to a body of water to maintain the electrolyte concentration in the water at a proper level for effective operation of the sanitizer generator. In the first embodiment of the automated system, when the conductivity of the water in the pool reaches a desired setpoint, a controller activates an electrolytic solution pump and powers on a sanitizer generator. The electrolytic solution pump draws electrolytic solution from a vessel to the circulation system and into the body of water. The automated system eliminates the need for manual addition of electrolyte to the pool by a pool attendant, thereby reducing safety concerns involved with handling and dispensing of the electrolyte as well as maintenance time. Additionally, the automated system also ensures that the concentration of sanitizer in the pool at any given time is maintained in a range that meets sanitation requirements and prevents corrosion.

In the second embodiment, the electrolytic solution is fed to the body of water with a fresh water line so that each time the pool is topped off, electrolyte is added to the body of water. A valve is installed between the vessel and the fresh water line that allows the feed stream to be shut off when the body of water only needs fresh water. In addition to the benefits discussed above, the automated system also reduces the pieces of equipment required to run the feed system. For example, an electrolytic solution pump and a sensor which senses the conductivity of the water is no longer needed.

In the third embodiment, electrolytic solution is continuously fed to the circulation system and the pool in small quantities. A metering valve is operatively connected to the vessel and controls the flow rate of electrolytic solution leaving the vessel. Because electrolyte is continuously being added to the system, the sanitizer generator can be powered on when the oxidation-reduction potential of the water reaches a desired setpoint without any other prerequisite steps. Similar to the first and second embodiments, the automated system also reduces safety concerns, maintenance time, and equipment, as well as maintains the sanitizer concentration in the body of water at a desired level.

Although the present invention has been described with reference to preferred embodiments, workers skilled in the art will recognize that changes may be made in form and detail without departing from the spirit and scope of the invention.

The invention claimed is:

1. An automated system for adding electrolyte into a body of water, the automated system comprising:
    (a) a sanitizer generator for producing sanitizer;
    (b) a circulation system having a suction line and a discharge line for delivering water from the body of water through a circulation path that includes the sanitizer generator; and
    (c) a delivery system for controlling introduction of the electrolyte into the water downstream of the sanitizer generator,
    wherein the delivery system comprises an electrolyte source and a flow control;
    wherein the flow control comprises a metering valve; and
    wherein the electrolyte is continuously added to the body of water.

2. The system of claim 1, and further comprising a sensor for sensing a parameter related to the water.

3. The system of claim 2, and further comprising a controller responsive to the sensor.

4. The system of claim 1, wherein a pressure drop allows the water from the circulation system to flow through the electrolyte source and back to the body of water.

5. The system of claim 1, wherein the electrolyte source is a salt feeder.

6. The system of claim 1, wherein the sanitizer generator is an electrolytic cell.

7. An automated method of sanitizing a body of water, the method comprising:
    (a) circulating water containing dissolved electrolyte from the body of water through a circulation system;
    (b) generating in the circulation system a sanitizer from the water containing dissolved electrolyte;
    (c) returning the sanitizer to the pool;
    (d) introducing electrolyte solution into the water downstream of the generation of the sanitizer to maintain a level of dissolved electrolyte in the water;
    (e) sensing a conductivity of the water; and
    (f) controlling, generation of a sanitizer and introducing electrolyte solution as a function of the conductivity sensed.

8. The method of claim 7, wherein introducing electrolyte solution comprises operating a pump to deliver electrolyte solution when the conductivity of the water reaches a desired setpoint.

9. An automated method of sanitizing a body of water, the method comprising:
    (a) circulating water containing dissolved electrolyte from the body of water through a circulation system;
    (b) generating in the circulation system a sanitizer from the water containing dissolved electrolyte;
    (c) returning the sanitizer to the pool; and
    (d) introducing electrolyte solution into the water downstream of the generation of the sanitizer to maintain a level of dissolved electrolyte in the water, wherein introducing electrolyte solution comprises continuously delivering electrolyte solution to the body of water.

10. The method of claim 9, wherein the electrolyte solution is delivered at a rate controlled by a metering valve.

11. The method of claim 7, wherein generating a sanitizer occurs in a electrolytic generator located in a flow path of the circulation system.

* * * * *

UNITED STATES PATENT AND TRADEMARK OFFICE
CERTIFICATE OF CORRECTION

| | |
|---|---|
| PATENT NO. | : 7,402,252 B2 |
| APPLICATION NO. | : 11/157020 |
| DATED | : July 22, 2008 |
| INVENTOR(S) | : Leonard J. Kadlec and Patrick H. Kilawee |

Page 1 of 1

It is certified that error appears in the above-identified patent and that said Letters Patent is hereby corrected as shown below:

Column 8, Claim 7, line 41: the "," should be deleted.

Signed and Sealed this

Twenty-third Day of September, 2008

JON W. DUDAS
*Director of the United States Patent and Trademark Office*